United States Patent [19]

Gerfast

[11] Patent Number: 4,750,067
[45] Date of Patent: Jun. 7, 1988

[54] HEAD POSITIONING MECHANISM FOR DATA CARTRIDGE RECORDER

[75] Inventor: Sten R. Gerfast, Mendota Heights, Minn.

[73] Assignee: Minnesota Mining and Manufacturing Company, St. Paul, Minn.

[21] Appl. No.: 755,306

[22] Filed: Jul. 12, 1985

[51] Int. Cl.⁴ .................. G11B 5/55; G11B 21/08; G11B 5/48; G11B 21/16
[52] U.S. Cl. .................. 360/106; 360/104; 360/107; 74/424.8 A
[58] Field of Search .............. 360/104, 105, 106, 109, 360/78, 93; 242/192, 199, 198; 74/424.8 A, 424.8 R

[56] References Cited

U.S. PATENT DOCUMENTS

| | | | |
|---|---|---|---|
| 2,293,218 | 8/1942 | Rieber | 74/424.8 A |
| 3,692,255 | 9/1972 | Von Behren | 242/192 |
| 4,125,049 | 11/1978 | Price, Jr. | 74/424.8 A |
| 4,313,143 | 1/1982 | Zarr | 360/106 |
| 4,333,116 | 6/1982 | Schoettle et al. | 360/78 X |
| 4,376,961 | 3/1983 | Torii et al. | 360/106 X |
| 4,523,240 | 6/1985 | Dunstan et al. | 360/97 |
| 4,609,959 | 9/1986 | Rudi | 360/109 |

FOREIGN PATENT DOCUMENTS 0837353  6/1960  United Kingdom .................. 30/109

Primary Examiner—John H. Wolff
Assistant Examiner—Alfonso Garcia
Attorney, Agent, or Firm—Donald M. Sell; James A. Smith; David W. Anderson

[57] ABSTRACT

A head positioning add mechanism for a multitrack data cartridge recorder including a stepper motor, a lead screw driven by the stepper motor and a head mounting slide engaged with the lead screw by a partial female thread for incrementally moving a recording/playback head transverse to the path of a magnetic recording tape to enable accurate positioning of the head at any given track across the tape.

6 Claims, 2 Drawing Sheets

HEAD POSITIONING MECHANISM FOR DATA CARTRIDGE RECORDER

BACKGROUND OF THE INVENTION

1. Field of the Invention

The present invention relates to magnetic tape recorders and to subassemblies utilized therein, particularly with respect to recorders adapted for multiple track recording using a single track head which is transversely movable with respect to the recording tape.

2. Description of the Prior Art

Data recording cartridges and recorders adapted for their use are disclosed and claimed in U.S. Pat. No. 3,692,225 (von Behren). In the cartridge there disclosed, a enclosure together with an endless flexible belt in frictional contact with the tape on both reel hubs for bidirectionally driving the tape, including rapid accelerations and decelerations, such as are encountered in digital data recording and playback. Recorders adapted to use such data cartridges originally employed fixed, multitrack heads which were complex, expensive and difficult to maintain in proper alignment.

To eliminate the multitrack heads, U.S. Pat. No. 313,143 (Zarr) disclosed a head positioning mechanism by which a single track head could be transversely positioned with respect to the width of the recording tape to enable recording and playback of any of a plurality of parallel tracks. While such a system operates entirely satisfactorily, it has recently been thought advantageous to reduce the size of the data recording cartridge and accordingly the recorder in which the cartridge is used. Simple miniaturization of the head positioning mechanism of the Zarr patent has not proven feasible, and so the head positioning mechanism has been redesigned for use with the smaller data cartridge recorder.

SUMMARY OF THE INVENTION

The present invention provides a simplified head positioning mechanism, in comparison to that of the Zarr patent, which variably positions a recording head transversely with respect to the width of the recording tape to enable recording and playback of any of a plurality of parallel tracks.

Particularly, the present invention is directed to a head positioning mechanism which includes a linear support means, a head mounting slide, a first biasing means, and means for driving the head mounting slide. The linear support means is a cylindrical shaft secured proximate the tape path and perpendicular to the direction of tape motion, and is adapted to have the head mounting slide mounted thereon for reciprocating motion. The head mounting slide is in turn adapted to receive the head and thus allow linear motion of the head across the width of the recording tape. In the absence of any counteracting force, the head mounting slide is directed to move the head toward one edge of the recording tape by a coil spring biasing means, while means for driving the head mounting slide responds to electrical signals to drive the head mounting slide against the bias of the coil spring. Accordingly, the recording head may be incrementally moved across the width of the recording tape.

The driving means specifically includes a stepper motor secured relative to the tape path, a lead screw mounted to a drive shaft of the stepper motor for converting rotary motion of the shaft into a corresponding linear movement, a partial female thread formed in the head mounting slide for coupling the head mounting slide to the lead screw and a second biasing means, comprising a coil spring, for urging the partial female thread into engagement with the lead screw.

Alternatively, the first and second biasing means may be replaced by a single coil spring oriented at a preferred angle of 45° with respect to the cylindrical linear support means.

BRIEF DESCRIPTION OF THE DRAWINGS

The present invention will be more thoroughly described with reference to the accompanying drawings, wherein like numbers refer to like parts in the several views, and wherein.

BRIEF DESCRIPTION OF THE PREFERRED EMBODIMENT

Figure 1:
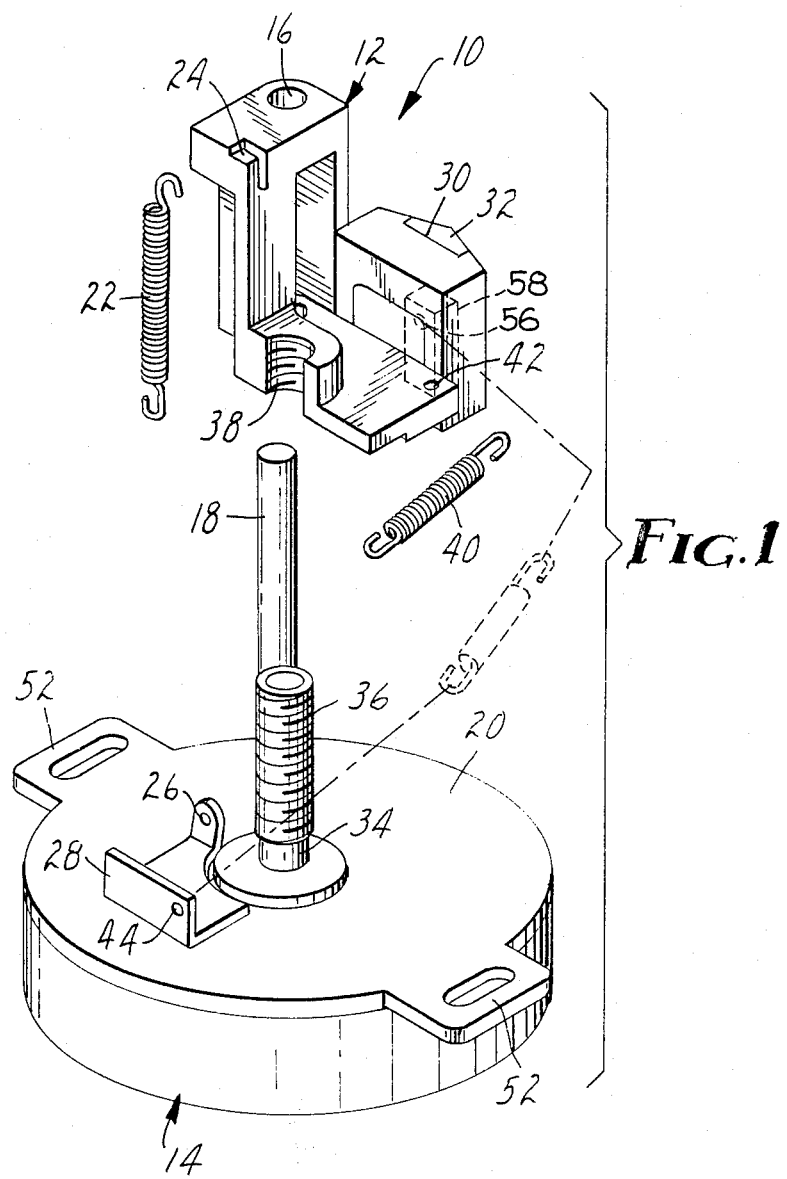
FIG. 1 is an exploded perspective view of a head positioning mechanism according to the present invention.

FIG. 1 illustrates a head positioning mechanism, generally indicated as 10, which primarily includes a head mounting slide 12 and a stepper motor 14 for driving the head mounting slide 12. The head mounting slide 12 includes a bore 16 which is slideably mounted on a cylindrical shaft 18 extending from a mounting cover 20 of the stepper motor 14.

The head mounting slide 12 is biased toward the stepper motor cover 20 by a coil spring 22 which attaches, at one end, to a recess 24 in the head mounting slide and at the other end to a hole 26 in a bracket 28 suitable attached to the stepper motor cover 20. In the absence of a countervailing force, the coil spring 22 would move the head mounting slide 12 downwardly toward the stepper motor cover 20.

The head mounting slide 12 is preferably molded of a polymeric material as a single unit and further includes a rectangular recess 30 into which is mounted a single channel recording (and playback) head 32 for incremental transverse motion with respect to a recording tape.

Movement of the recording head 32 is caused by movement of the head mounting slide 12 along the mounting shaft 18, this movement of the head mounting slide 12 in turn being caused by operation of the stepper motor 14.

Incremental electrical pulses supplied to the stepper motor 14 cause rotation of a shaft 34 to which is fixed a male lead screw 36. The lead screw 36 is coupled to the head mounting slide 12 by means of a partial female thread 38 which is integrally molded as a part of the head mounting slide 12. Since the partial female thread 38 does not completely surround the lead screw 36, a second coil spring 40 is provided which biases the head mounting slide 12, and the female thread 38, into engagement with the lead screw 36. The coil spring 40 is connected between the head mounting slide 12 at a molded or drilled hole 42 and a second hole 44 formed in the stepper motor bracket 28. Rotation of the lead screw 36, in one direction, forces the head mounting slide 12 away from the stepper motor 14 against the bias of the coil spring 22, and opposite rotation of the lead screw 36 allows the coil spring 22 to urge the head mounting slide 12 toward the stepper motor 14.

The head mounting slide 12 is provided with a partial female thread 38 because accurate parallel alignment of the lead screw drive shaft 34 and the mounting shaft 18 cannot be guaranteed in a production setting. If the female thread 38 completely surrounded the lead screw 36, and the shafts 18 and 34 were not parallel, binding between the lead screw 36 and the female thread 38 could occur and the stepper motor 14 would possibly stall. The partial female thread 38 accommodates misalignment of the drive shaft 34 relative to the mounting shaft 18 so long as the circumferential extent of the female thread 38 is less than 180° and, therefore, does not capture the lead screw 36. The minimum circumferential wrap of the female thread 38 relative to the lead screw 36 is that which provides reliable engagement between the female 38 and the lead screw 36 and is capable of transmitting a force sufficient to lift the head mounting slide 12 against the bias of the coil spring 22. As a practical matter, it is believed that a circumferential wrap of 60° minimum is required for reliable engagement between the female thread 38 and the lead screw 36. The preferred circumferential, engagement is between approximately 90° and 120°. A partial female thread 38 of less than the 180° shown in FIG. 1 is easily achieved by adjusting an end wall 45 of the slide 12 as seen in FIG. 1.

Figure 2:
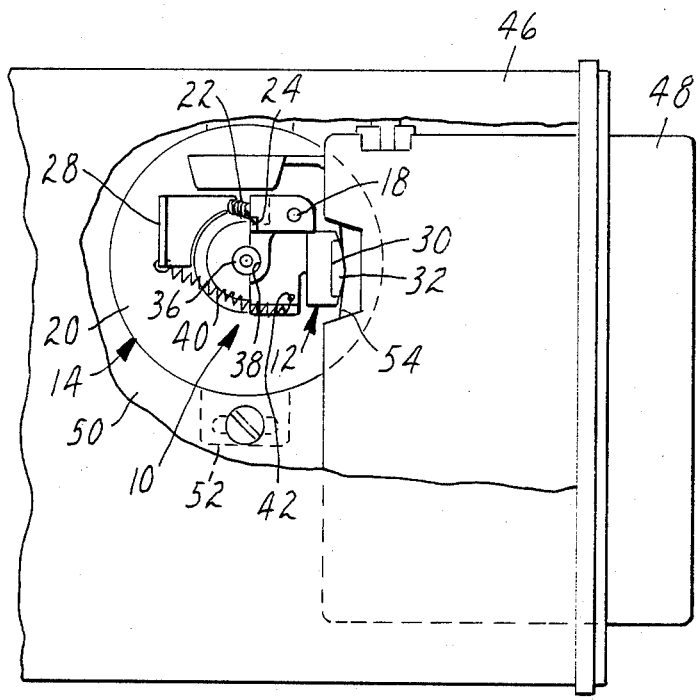
FIG. 2 is a top plan view of a data cartridge and data cartridge recorder employing the head positioning mechanism of FIG. 1, with portions broken away to show details.
Figure 3:
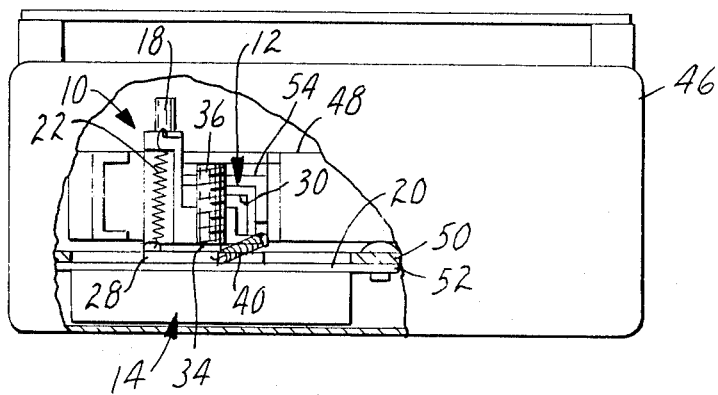
FIG. 3 is a rear elevational view of the data cartridge recorder of FIG. 2, with portions broken away to illustrate details of the head positioning mechanism.

FIGS. 2 and 3 illustrate a data cartridge tape recorder 46 (with electrical connections, electronic control circuitry and tape drive mechanism omitted) which mounts the head positioning mechanism 10 and which accepts a data cartridge 48. The stepper motor 14 is mounted to an internal plate 50 within the tape recorder 46 by mounting ears 52 such that the lead screw 36 and mounting shaft 18 are oriented perpendicular to the direction of movement of a recording tape 54 extending from the data cartridge 48. This orientation allows the recording head 32, and the head mounting slide 12, to move across the width of the recording tape 42, transversely to the direction of tape 54 travel. This transverse movement of the recording head 32 allows a multiplicity of parallel and separate tracks to be recorded along the length of the recording tape 54. Incremental movement of the recording head 32 across the width of the recording tape 54 is achieved, as explained above, by incremental rotation of the lead screw 36 of the stepper motor 14.

Although the present invention has been described with respect to only a single embodiment, it is understood that many modifications will be apparent to those skilled in the art. For example, the present invention includes two coil springs 22 and 40 which bias the head mounting slide 12 toward the stepper motor 14 and the head mounting slide 12 into engagement with the lead screw 36, respectively. These coil springs 22 and 40 are oriented at approximately 90° with repect to each other for maximum efficiency, but it should be recognized that the two springs 22 and 40 could be replaced by a single coil spring mounted between, for example, a hole 56 in an extension 58 of the head mounting slide 12, as shown in phantom lines in FIG. 1, and the hole 44 in the stepper motor bracket 28 at an angle of approximately 45°. Such a coil spring, and such an orientation, would provide vectored forces which would be once accomplish the purposes of the springs 22 and 40. Two springs, however, are preferred for simplicity and efficiency.

Also, while the present invention has been particularly described with respect to a data cartridge, the head positioning mechanism 10 could be used with any moving tape, such as reel-to-reel, audio tape cassettes or video tape cassettes.

Finally, the invention should not be limited for use with only a single recording/playback head. While the head positioning mechanism 10 has been presented as an alternative to multitrack heads, a hybrid is possible. The head positioning mechanism 10 could support more than one head while still moving these heads relative to the tape. Access time between tracks could thereby be reduced by electronically switching between heads.

All such modifications falling within the spirit and scope of the appended claims are intended to be included in the present invention.

I claim:

1. In a tape recorder adapted for incremental recording and playback of data from a multiplicity of parallel tracks extending the length of a magnetic recording tape and in which at least one recording/playback head is adapted to interface with the tape along a tape transport path and to be variably positioned transversely with respect to the tape, a head positioning mechanism comprising:
    (a) linear support means secured proximate to a said transport path and generally perpendicular to the direction of motion of a said tape,
    (b) head mounting means pivotably and slideably mounted on said support means and adapted to receive a said at least one head for linear travel of a said at least one head across a said tape,
    (c) first biasing means for directing said mounting means to move a said at least one head toward one edge of a said tape in the absence of any counteracting force, and
    (d) means for incrementally driving said mounting means against said first biasing means, thereby incrementally moving a said at least one head toward the opposite edge of a said tape, and for controlling the motion of said mounting means as directed by said biasing means, thereby controlling the incremental movement of a said head toward said one edge, said driving means including:
        (i) a stepper motor secured relative to a said transport path and having a drive shaft rotatably mounted therein,
        (ii) lead screw means mounted to said drive shaft of said stepper motor for converting rotary motion of said shaft into corresponding linear movement,
        (iii) a partial female thread attached to said mounting means for coupling said mounting means to said lead screw, wherein said partial female thread contacts said lead screw for 180° or less of the circumference of said lead screw, so that said head mounting means may pivot toward and away from said lead screw to accommodate any any misalignment between said lead screw and said partial female tread and
        (iv) second biasing means for urging said partial female thread into engagement with said lead screw.

2. A head positioning mechanism according to claim 1 wherein said partial female thread contacts said lead screw for between about 60° to 180° of the circumference of said lead screw.

3. A head positioning mechanism according to claim 1 wherein said linear support means is a single cylindrical shaft and the axis of said shaft is substantially parallel to that of said lead screw.

4. A head positioning mechanism according to claim 1 wherein said first and said second biasing means are combined into a single biasing element oriented at an angle to said linear support means and operating in a direction which simultaneously urges said head mounting means toward said one edge of a said tape and said female thread into engagement with said lead screw.

5. A head positioning mechanism according to claim 4 wherein said linear transport means is a cylindrical shaft having an axis parallel to that of said lead screw and wherein said single biasing element is a coil spring.

6. A head positioning mechanism according to claim 5 wherein said spring is disposed at approximately 45° with respect to said axis of said cylindrical shaft.

* * * * *

UNITED STATES PATENT AND TRADEMARK OFFICE
CERTIFICATE OF CORRECTION

PATENT NO. : 4,750,067
DATED : June 7, 1988
INVENTOR(S) : Sten R. Gerfast

It is certified that error appears in the above-identified patent and that said Letters Patent is hereby corrected as shown below:

In the Abstract, line 1, delete "add".
Column 1, line 16, after "a" insert --magnetic recording tape is preloaded in a reel-to-reel type--.
Column 1, line 25, correct "313,143" to --4,313,143--.
Column 3, line 68, correct "be" to --at--.

Signed and Sealed this

Third Day of January, 1989

*Attest:*

DONALD J. QUIGG

*Attesting Officer*  *Commissioner of Patents and Trademarks*